United States Patent [19]

Funami et al.

[11] Patent Number: 5,030,148

[45] Date of Patent: Jul. 9, 1991

[54] PISTON ROD CONNECTING STRUCTURE FOR OUTBOARD MOTOR

[75] Inventors: Yasuo Funami; Tadaaki Muruyama, both of Saitama, Japan

[73] Assignee: Kabushiki Kaisha Showa Seisakusho, Japan

[21] Appl. No.: 417,700

[22] Filed: Oct. 5, 1989

[30] Foreign Application Priority Data

Oct. 5, 1988 [JP] Japan .................... 63-130782[U]

[51] Int. Cl.$^5$ .............................................. F16J 1/12
[52] U.S. Cl. .................................... 440/61; 92/255
[58] Field of Search ............... 92/255, 171.1, 169.1; 403/326, 355, 361; 440/49, 53, 61

[56] References Cited

U.S. PATENT DOCUMENTS

| | | | |
|---|---|---|---|
| 3,056,573 | 10/1962 | Matheson | 92/255 |
| 3,581,702 | 6/1971 | Moberg | 440/61 |
| 3,722,455 | 3/1973 | Carpenter | 440/56 |
| 3,807,285 | 4/1974 | Phillips | 92/255 |
| 4,069,747 | 1/1978 | Forry | 92/255 |
| 4,669,364 | 6/1987 | Komatsu | 92/255 |
| 4,720,278 | 1/1988 | Taguchi et al. | 440/61 |
| 4,926,745 | 5/1990 | Cioletti | 92/255 |

Primary Examiner—Joseph F. Peters, Jr.
Assistant Examiner—Clifford T. Bartz
Attorney, Agent, or Firm—Howard L. Rose

[57] ABSTRACT

A connecting structure for a rod in an outboard motor includes a rod having an end forced in a piston, and a stopper ring disposed between the rod and the piston.

6 Claims, 3 Drawing Sheets

PISTON ROD CONNECTING STRUCTURE FOR OUTBOARD MOTOR

BACKGROUND OF THE INVENTION

1. Field of the Invention

The present invention relates to a connecting structure for a piston rod in a tilt and trim mechanism for use with an outboard motor.

2. Description of the Relevant Art

U.S. Pat. Nos. 3,581,702, 3,722,455, and 4,720,278 disclose tilt and trim mechanisms for use with outboard motors for small ships such as motorboats, for example. Each of the disclosed tilt and trim mechanisms has tilt and trim cylinder units for tilting and trimming, respectively, the outboard motor by turning a swivel bracket of the outboard motor about a horizontal axis. The outboard motor is vertically moved above and below a water level by the tilt cylinder unit, and is also angularly adjusted below the water level by the trim cylinder unit.

As shown in U.S. Pat. No. 3,722,455 in particular, the trim cylinder unit comprises a cylinder fixed to the transom of a boat, a piston axially slidably fitted in the cylinder, and a trim rod having one end which is joined, e.g., welded, to the piston. The other end, i.e., outer end, of the trim rod is pivotally mounted on the swivel bracket of the outboard motor.

With the trim rod being conventionally joined to the piston in the trim cylinder unit, the tilt and trim mechanism is highly costly to manufacture.

In general hydraulic cylinder units, the piston rod is fixed to the piston by a bolt and nut mechanism. Such a connecting structure for the piston rod is also expensive.

The present invention has been made in an effort to eliminate the drawback of the conventional connecting structures for the piston rods used in tilt and trim mechanisms for outboard motors.

SUMMARY OF THE INVENTION

It is an object of the present invention to provide a connecting structure for a piston rod for use with an outboard motor, the connecting structure being free of welded parts and inexpensive to manufacture.

According to the present invention, there is provided a connecting structure for a rod and a piston in an outboard motor, comprising a piston, a rod having an end forced in the piston, and a stopper ring disposed between the end of the rod and the piston.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENTS

Figure 1:
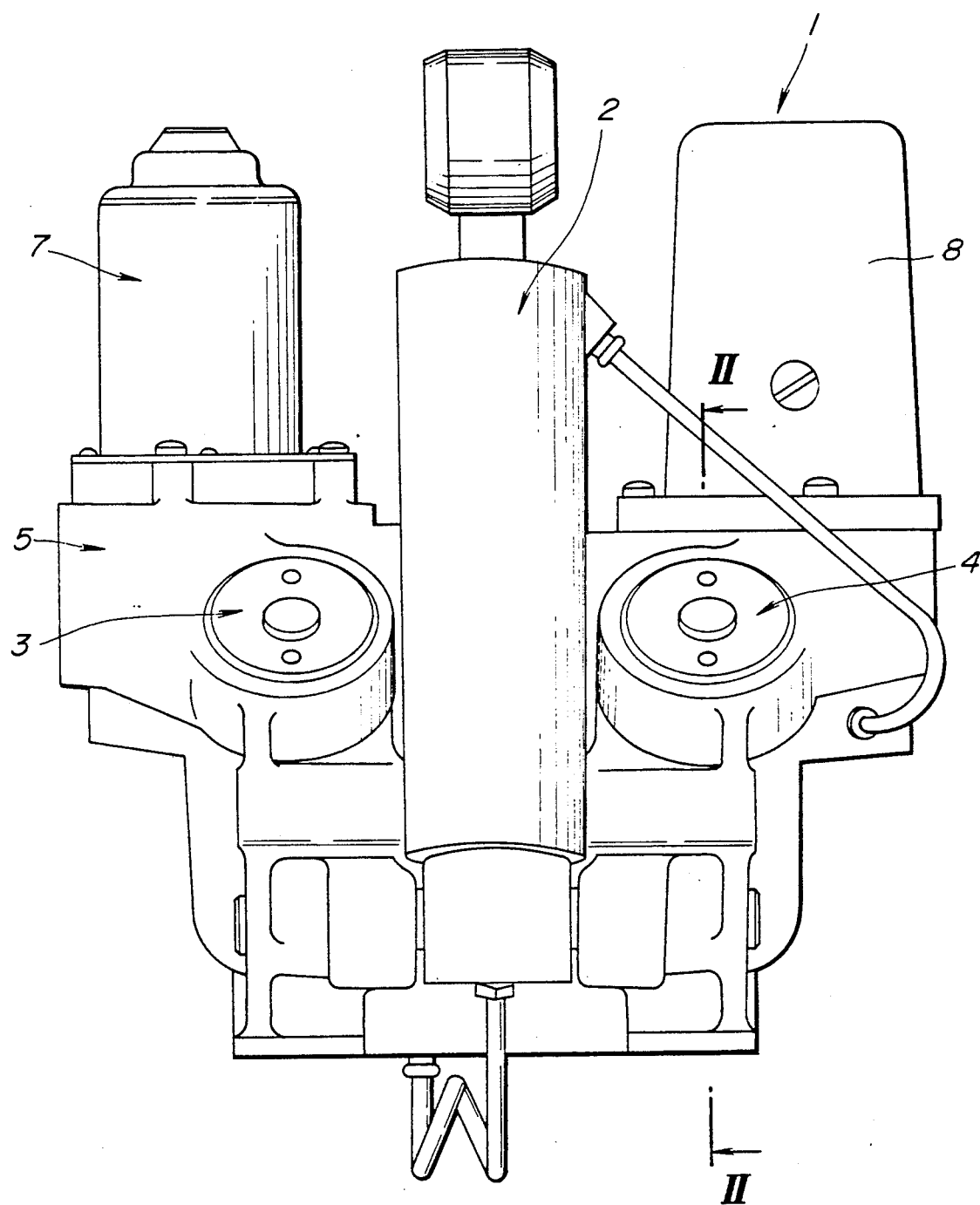
FIG. 1 is an elevational view of a tilt and trim mechanism for use with an outboard motor, the tilt and trim mechanism having a connecting structure for a piston rod according to a first embodiment of the present invention.

FIG. 1 shows a trim and tilt mechanism 1 for use with an outboard motor (not shown), having a connecting structure 50 for a piston rod according to a first embodiment of the present invention. The tilt and trim mechanism 1 comprises a single tilt cylinder unit 2 disposed centrally therein and a pair of laterally spaced trim cylinder units 3, 4 disposed one on each side of the tilt cylinder unit 2. The trim cylinder units 3, 4 are of an identical structure. The tilt and trim mechanism 1 also has a manifold 5 which accommodates therein a hydraulic pump (not shown) for supplying working oil under pressure to the cylinder units 2, 3, 4. A motor 7 for actuating the hydraulic pump is mounted on the manifold 5 near the trim cylinder unit 3. A tank 8 for storing working oil is mounted on the manifold 5 near the other trim cylinder unit 4.

Figure 2:
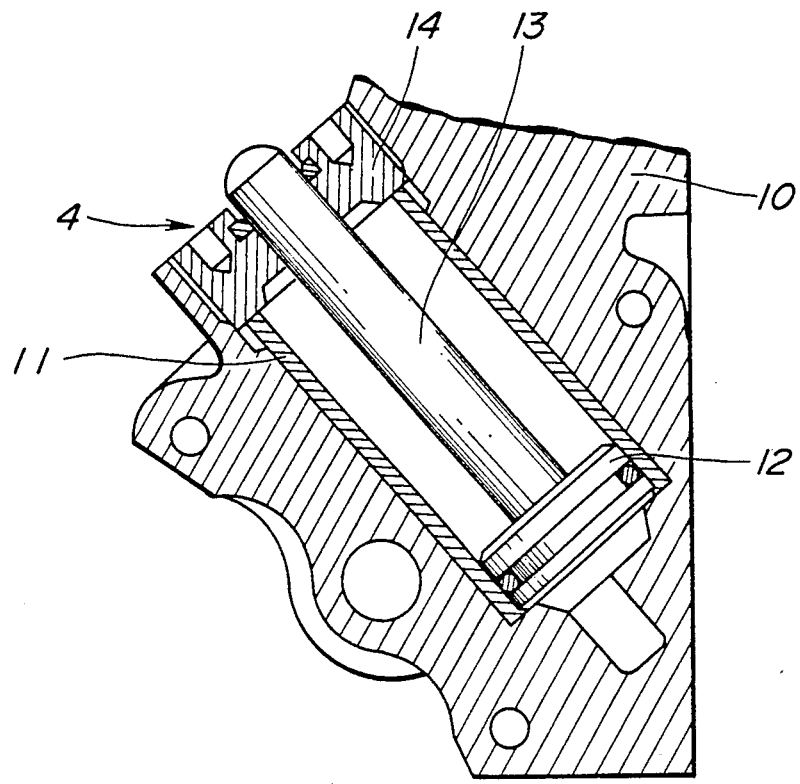
FIG. 2 is a cross-sectional view taken along line II—II of FIG. 1, showing a trim cylinder unit.

As shown in FIG. 2, the trim cylinder unit 4 comprises a cylinder 11 fitted in a housing 10 fixed to a boat transom (not shown), a cap 14 threaded in the housing 10 and closing the upper open end of the cylinder 11, a piston 12 axially slidably fitted in the cylinder 11, and a trim rod 13 having an inner end mounted in the piston 12 and extending through the cap 14. The piston 14 has an inner bore 12a (FIG. 3) defined therein and an annular engaging groove 12b defined in the inner surface of the inner bore 12a and opening into the inner bore 12a. The trim rod 13, which is a piston rod coupled to the piston 14, has its outer end coupled to a swivel bracket (not shown) of the outboard motor.

Figure 3:
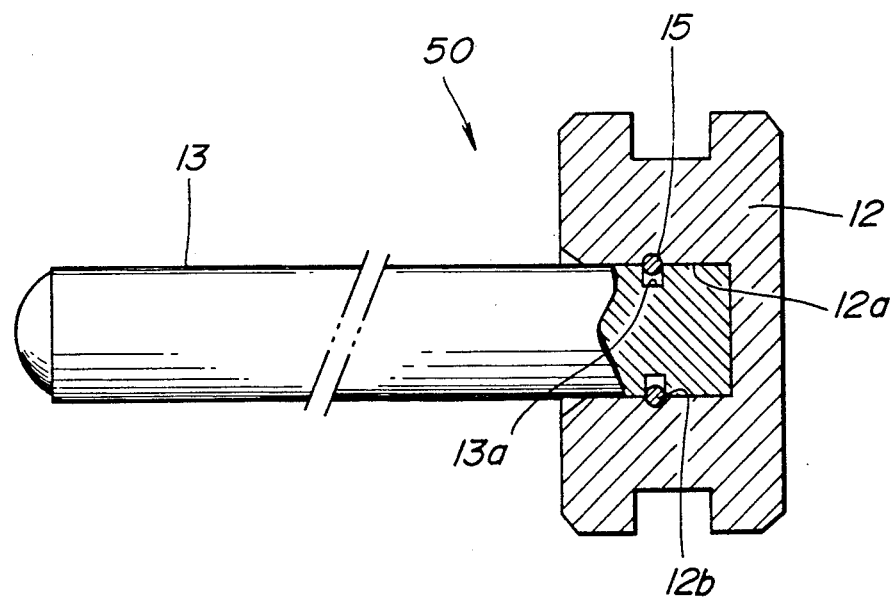
FIG. 3 is a cross-sectional view showing the manner in which a trim rod and a piston of the trim cylinder unit are connected to each other.

As illustrated in FIG. 3, the connecting structure 50 is provided by first mounting a stopper ring 15 in an annular outer groove 13a defined in the inner end of the trim rod 13, and then forcing the trim rod 13 into the inner bore 12a in the piston 12, thus connecting the trim rod 13 to the piston 12. Basically, the inside diameter of the inner bore 12a is slightly larger than the outside diameter of the trim rod 13. Therefore, the trim rod 13 is firmly fitted in the bore 12a. With the trim rod 13 fully inserted in the bore 12a, the engaging groove 12b and the other groove 13a are held in radial alignment with each other, and the stopper ring 15 slightly spreads radially outwardly into the engaging groove 12b. The trim rod 13 is therefore reliably prevented from being removed from the piston 12 by the stopper ring 15.

The connecting structure 50 can be achieved simply by forcing the trim rod 13 with the stopper ring 15 mounted thereon into the inner bore 12a in the piston 12. Therefore, the connecting structure 50 is assembled in a smaller number of steps than would be if the trim rod were welded to the piston. The connecting structure 50 is thus less costly to manufacture, and so is the tilt and trim mechanism 1.

The trim rod 13 is reliably prevented from being dislodged from the piston 12 by the stopper ring 15 disposed between the trim rod 13 and the piston 12.

Figure 4:
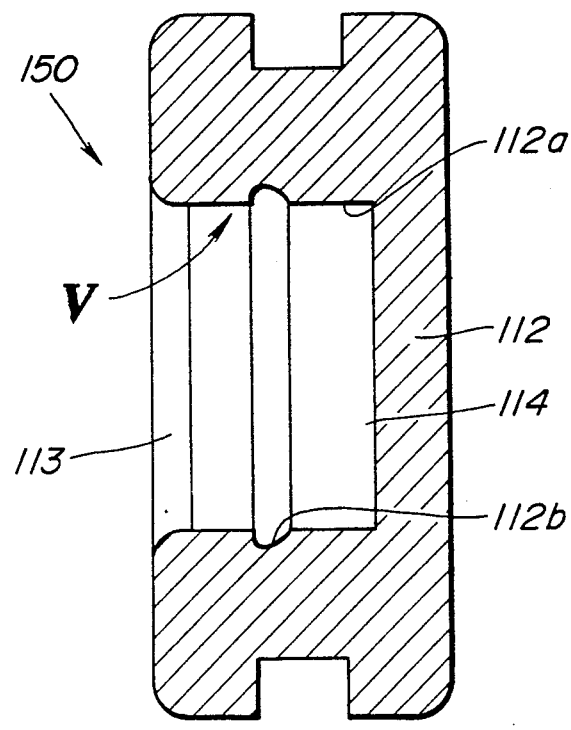
FIG. 4 is a cross-sectional view of a piston having a connecting structure for a piston rod according to a second embodiment of the present invention.

FIG. 4 shows a connecting structure 150 for a piston rod in accordance with a second embodiment of the present invention. The connecting structure 150 is essentially identical in structure with the connecting structure 50, except for a piston 112. Those identical components are denoted by identical reference numerals, and will not be described in detail.

The piston 112 has an inner bore 112a defined therein and having an opening 113 and a bottom 114. The piston 112 also has an annular engaging groove 112b defined in the inner surface of the inner bore 112a and opening into the inner bore 112a.

Figure 5:
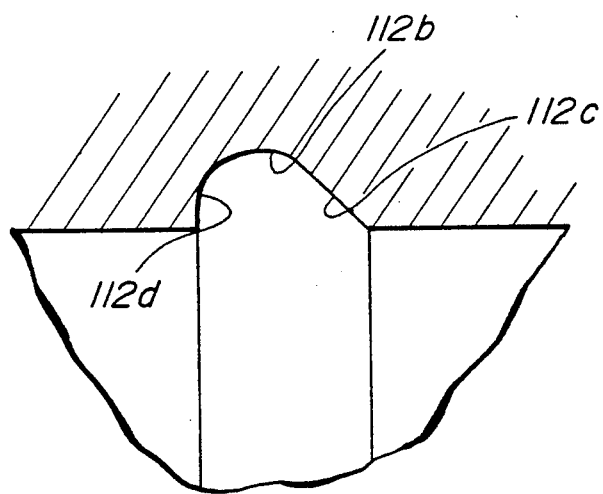
FIG. 5 is a fragmentary cross-sectional view of an area indicated by the arrow V in FIG. 4.

As shown in FIG. 5, the annular engaging groove 112a has a tapered surface 112c closer to the bottom 114 of the inner bore 112a and a radial surface 112d closer to the opening 113 of the inner bore 112a and extending substantially perpendicularly to the axis of the bore 112a. When a trim rod is forced into the bore 112a, a stopper ring mounted on the trim rod is first received by the tapered surface 112c, then slightly displaced back toward the opening 113. Therefore, the stopper ring is reliably held in the engaging groove 112b. After the connecting structure 150 is established, the trim rod is securely joined to the piston rod 112 against removal by the radial surface 112d of the engaging groove 112b which blocks and retains the stopper ring in the engaging groove 112b.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A connecting structure for a rod and a piston in an outboard motor, comprising:
   a piston;
   a rod having an end dimensioned such that it must be forced into said piston; and
   a stopper ring disposed between said end of the rod and said piston.

2. A connecting structure according to claim 1, further including a tilt and trim mechanism associated with the outboard motor, said tilt and trim mechanism having a trim cylinder unit which comprises said piston and said rod as a trim rod.

3. A connecting structure for a piston rod, comprising:
   a piston;
   said piston having a dead end bore defined therein and an engaging groove defined in an inner surface of said dead end bore and opening thereinto;
   a piston rod having a inner end inserted in said dead bore and contacting the end of said bore when fully inserted;
   said piston rod having an outer groove defined in said inner end of the piston rod said outer groove being held in radial alignment with said engaging groove with said piston rod fully inserted in said inner bore; and
   a stopper ring engaging in said engaging groove and said outer groove, thereby preventing said piston rod from being removed from said piston.

4. A connecting structure according to claim 3, wherein said piston rod and said stopper ring are dimensioned such that they must be forced in said bore in said piston.

5. A connecting structure according to claim 4, wherein said bore in said piston has an opening and a bottom surface, said engaging groove having a tapered surface closer to said bottom surface.

6. A connecting structure according to claim 3, wherein said bore in said piston is of an annular shape, and said outer groove in said piston rod is of an annular shape.

* * * * *